United States Patent
Uhlig

[19]

[11] Patent Number: 5,915,505
[45] Date of Patent: Jun. 29, 1999

[54] DISC BRAKE SYSTEM WITH UNITARY SUPPORT

[75] Inventor: Robert P. Uhlig, Rochester Hills, Mich.

[73] Assignee: Chrysler Corporation, Auburn Hills, Mich.

[21] Appl. No.: 08/931,605

[22] Filed: Sep. 16, 1997

[51] Int. Cl.[6] .................................................. F16D 65/38
[52] U.S. Cl. ............................. 188/73.37; 188/206 R; 188/205 A; 188/250 G
[58] Field of Search .................... 188/73.1, 73.31–73.37, 188/73.39–73.43, 250 B, 250 D, 250 F, 250 G, 205 A, 205 R, 206 A, 206 R

[56] References Cited

U.S. PATENT DOCUMENTS

| | | | |
|---|---|---|---|
| 3,051,272 | 8/1962 | Burnett | 188/73 |
| 3,343,770 | 9/1967 | Szonn | 188/250 G |
| 3,920,104 | 11/1975 | Hoffman | 188/250 B |
| 3,972,393 | 8/1976 | Courbet et al. | 188/73.1 |
| 4,146,118 | 3/1979 | Zankl | 188/73.1 |
| 4,200,173 | 4/1980 | Evans et al. | 188/250 B |
| 4,537,290 | 8/1985 | Evans | 188/73.31 |
| 4,560,038 | 12/1985 | Gerard et al. | 188/73.1 |
| 4,823,921 | 4/1989 | Bosco | 188/250 G |
| 4,858,732 | 8/1989 | Taylor, Jr. | 188/250 G |
| 4,865,763 | 9/1989 | Kondo | 188/73.1 |
| 4,944,371 | 7/1990 | Giorgetti | 188/73.39 |
| 5,113,978 | 5/1992 | Weiler et al. | 188/73.31 |
| 5,129,487 | 7/1992 | Kobayashi et al. | 188/73.1 |
| 5,551,537 | 9/1996 | Mery et al. | 188/73.1 |
| 5,588,508 | 12/1996 | Le Deit | 188/73.31 |
| 5,622,241 | 4/1997 | Null | 188/73.42 |

FOREIGN PATENT DOCUMENTS

| | | |
|---|---|---|
| 145977A | 8/1995 | European Pat. Off. . |
| 4224914 | 7/1992 | Germany . |

*Primary Examiner*—Chris Schwartz
*Attorney, Agent, or Firm*—Lawrence J. Shurupoff

[57] ABSTRACT

A mounting assembly for a disc brake pad is disclosed. The disc brake pad has a first end portion provided with a finger engaged in a slot of a reaction block to partially restrain the disc brake pad. The disc brake pad has a substantially unrestrained second end portion which is cantilevered from the first end portion. Braking forces are reacted virtually exclusively against the reaction block which is located externally of and separated from the disc brake caliper assembly.

3 Claims, 3 Drawing Sheets

DISC BRAKE SYSTEM WITH UNITARY SUPPORT

FIELD OF THE INVENTION

This invention relates generally to braking systems and more particularly to a disc brake system having a unitary support for the brake pads.

BACKGROUND OF THE INVENTION

In a typical disc brake, a rotor secured to one of the wheels of an automotive vehicle rotates between a pair of brake pads. The braking load, when the brake pads engage the rotor, are reacted against abutments or rails at opposite ends of each pad. The pad ends push against one rail or the other depending on the direction of rotation. This produces a couple and forces the leading edges of the brake pads together, giving rise to instability and noise.

SUMMARY OF THE INVENTION

In accordance with the present invention, each disc brake pad has one end portion connected to and partially restrained by a support, and a second free end portion which is cantilevered from the first end portion.

More particularly, the disc brake assembly includes an axially rotatable brake rotor disposed between two brake pads. Each brake pad has a leading end portion and a trailing end portion. The leading end portions of the brake pads engage and are circumferentially restrained by a support. The trailing end portions are cantilevered from the leading end portions. During forward braking, the pads pull rather than push against the support which provides a reaction abutment. A more stable and quieter braking action is the result.

Preferably, the support for the brake pads comprises a rail in the form of a reaction block having a pair of slots, with the leading end portions of the brake pads having fingers respectively restrained within the slots. In normal forward wheel rotation, as soon as the brake is applied, the brake pads are pulled circumferentially by the friction forces which are reacted by the reaction block, effectively acting as a pinned joint at the interface between the reaction block and the fingers. The brake pads engage the rotor beyond this interface rather than before it. Therefore, the brake pads are dragged or pulled over the rotor rather than pushed, providing much less potential for vibration and noise. Both forward and reverse wheel rotation braking forces are reacted by the same reaction block. Since no trailing brake pad reaction block is required, unsprung mass is reduced. Less raw material is used, thereby lowering material costs. The associated vibrational propensities of a trailing brake pad restraint are eliminated. Brake pad cooling is improved because potential airflow is increased.

One object of this invention is to provide a disc brake assembly having the foregoing features and capabilities.

Another object of the invention is to provide a disc brake assembly which is more stable and quiet, is composed of a relatively few simple parts, is rugged and durable in use, and can be readily manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
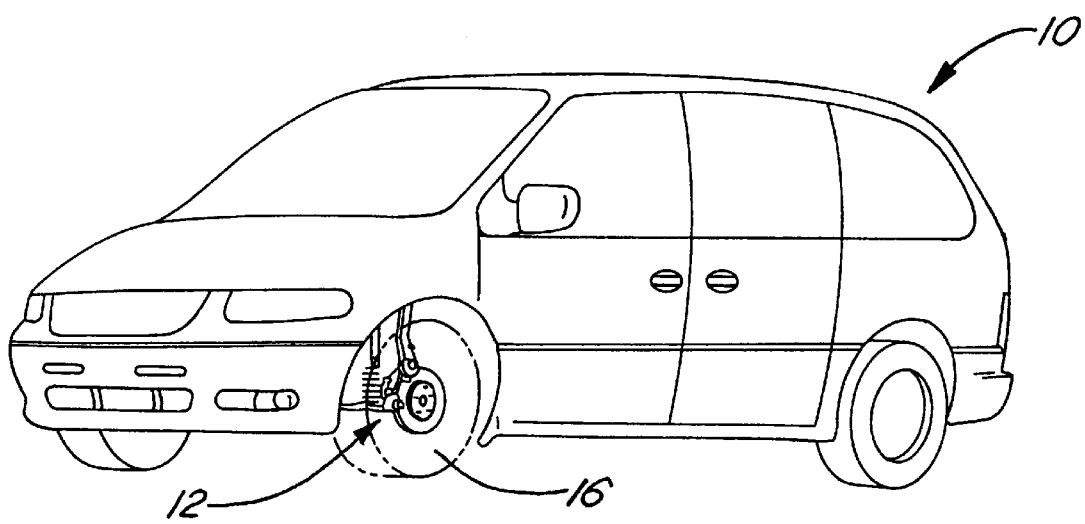
FIG. 1 is a perspective view of an automobile equipped with a braking system constructed in accordance with the invention.
Figure 2:
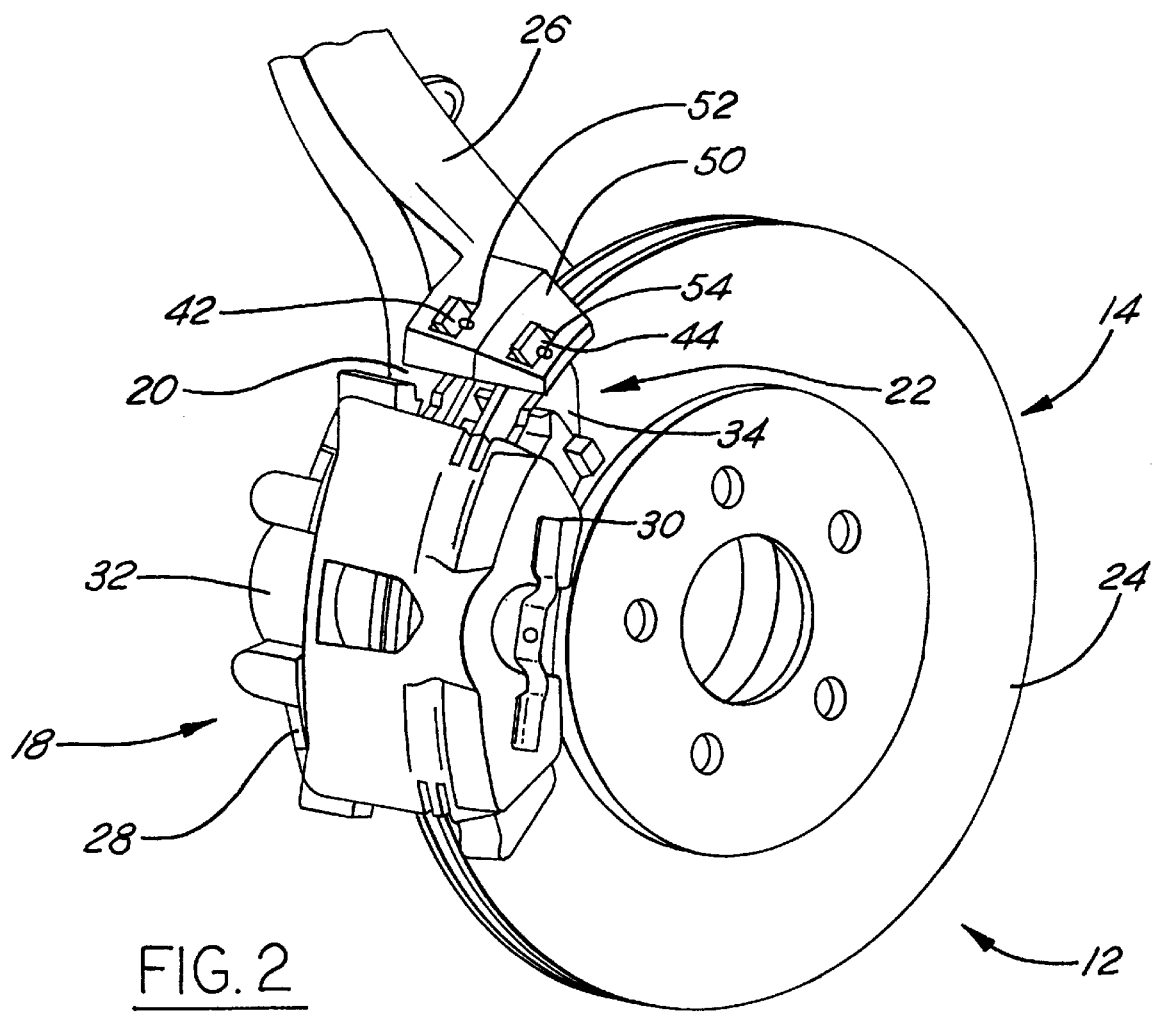
FIG. 2 is a perspective view of the braking system.

Referring now more particularly to the drawings, there is shown in FIG. 1 an automobile 10 having a disc brake 12 constructed in accordance with the invention. In FIG. 2, the disc brake 12 is shown to include a circular rotor 14 concentric with and secured to a wheel 16 of the automobile 10 for axial rotation therewith, and a generally U-shaped caliper 18 having brake pads 20 and 22 on opposite sides of the outer peripheral portion 24 of the rotor.

As further seen in FIG. 2, a steering knuckle 26 provides a base or support for the caliper 18. The caliper 18 embraces the peripheral portion 24 of the rotor and has jaws 28 and 30 on opposite sides thereof to which one or more brake pads may be spring clipped. The jaw 28 is provided with a hydraulic cylinder 32 for urging the brake pad 20, which may be spring clipped to it, against one face of the peripheral portion 24 of the rotor and by reaction, the pad 22 against the opposite face of the peripheral portion of the rotor. This much of the disc brake is of conventional construction, as more fully described in U.S. Pat. No. 4,944,371 which is incorporated herein in its entirety by reference.

Figure 3:
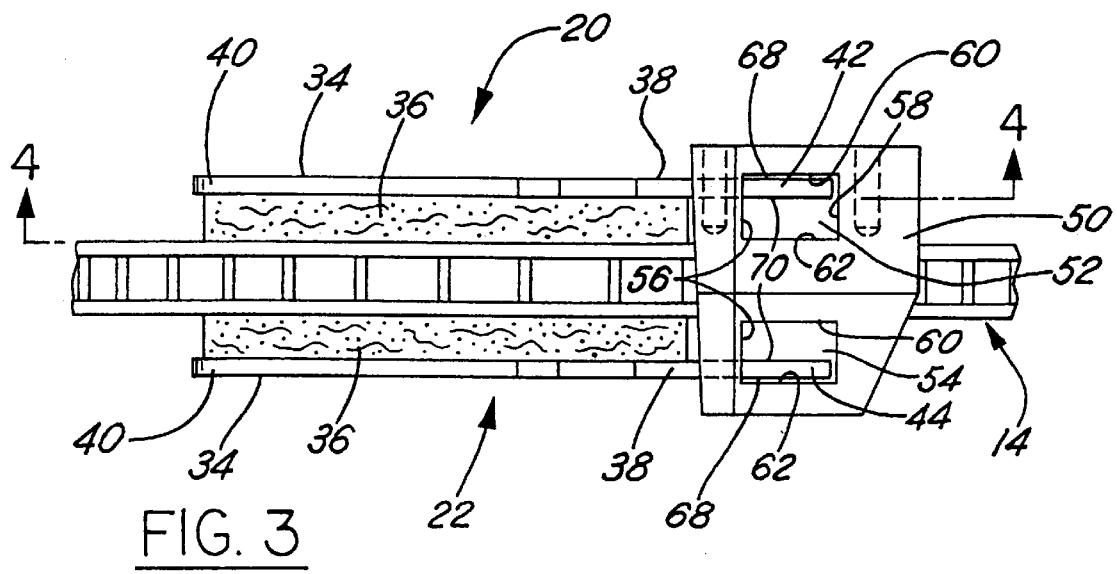
FIG. 3 is a fragmentary top view showing the brake pads on opposite sides of the rotor.

Each of the brake pads 20 and 22 comprises an elongated, arcuate, flat, planar backing plate 34 (FIG. 3) which is parallel to the rotor, and a body 36 of frictional material on the laterally inner surface thereof facing the peripheral portion 24 of the rotor. The arcuate backing plates 34 are parallel to one another and each has the same radius as the outer peripheral portion 24 of the rotor and is centered on the axis of the rotor.

Figure 4:
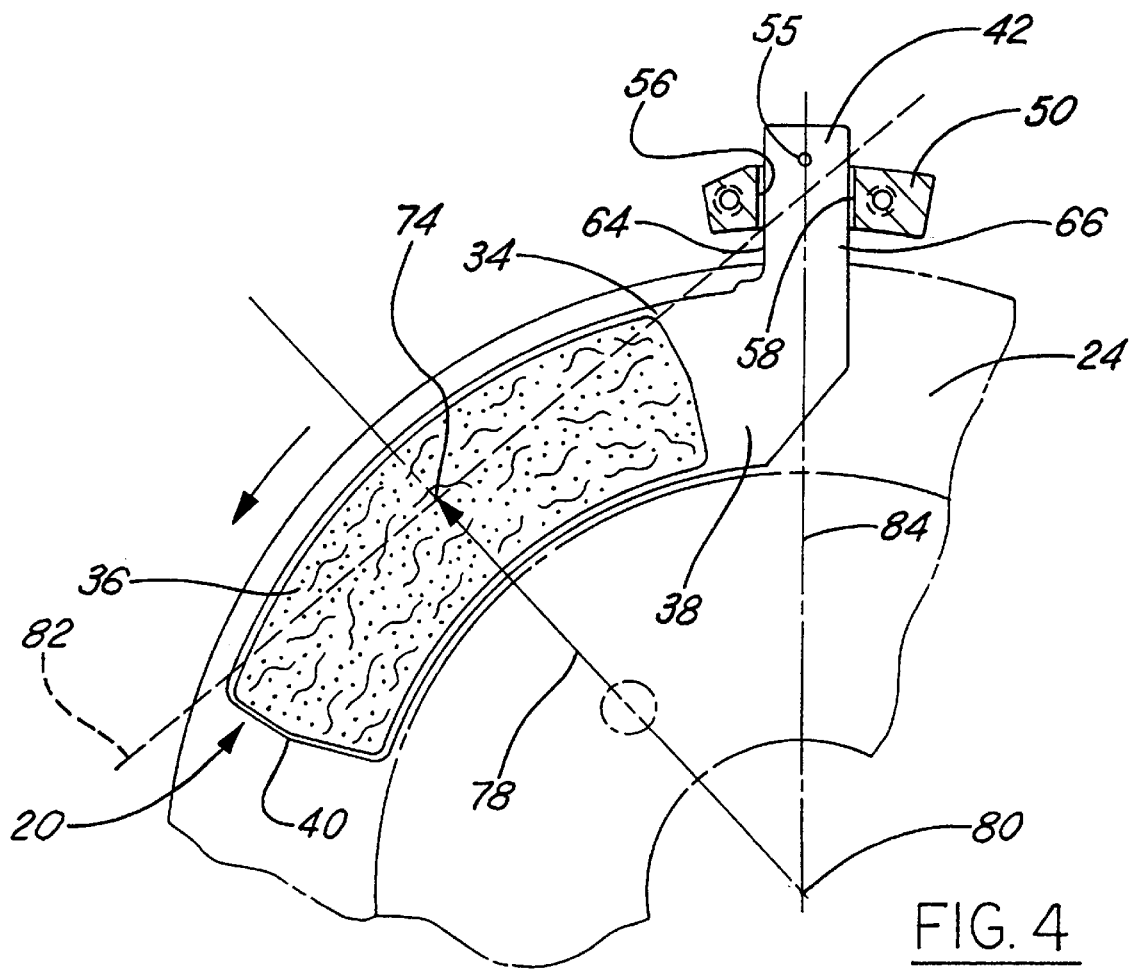
FIG. 4 is a view with parts in elevation and parts in section taken on the line 4—4 in FIG. 3.

In FIG. 4, each of the brake pads 20 and 22 is shown to include opposite end portions 38 and 40. When the wheel 16 and rotor 14 are rotating counterclockwise in FIG. 4 (the forward direction), the end portion 38 is the leading end portion and the end portion 40 is the trailing end portion. The leading end portion 38 of the brake pad 20 has a radially outwardly extending finger 42 which is a flat, integral, coplanar extension of the backing plate of the brake pad 20. The leading end portion 38 of the brake pad 22 has a radially outwardly extending finger 44 which is a flat, coplanar, integral extension of the backing plate of the brake pad 22. Line 84 is a radius from the center 80 of rotation of the rotor 14 drawn through the center of finger 42. Fingers 42 and 44 may extend outwardly parallel to line 78 (which also passes through the midpoint 80), or parallel to any line passing through midpoint 80 between lines 78 and 84. Proper choice of finger orientation per these guidelines allows further reduction of radial instability.

Figure 5:
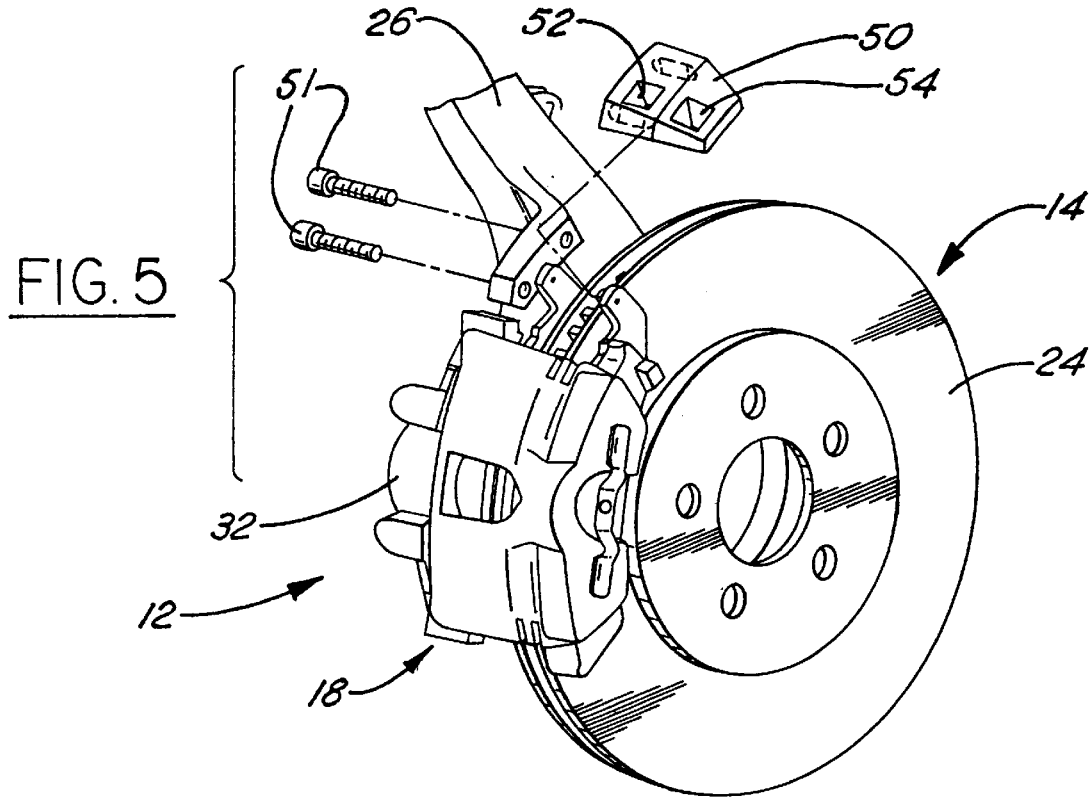
FIG. 5 is a perspective somewhat similar to FIG. 2, but is an exploded view.
Figure 6:
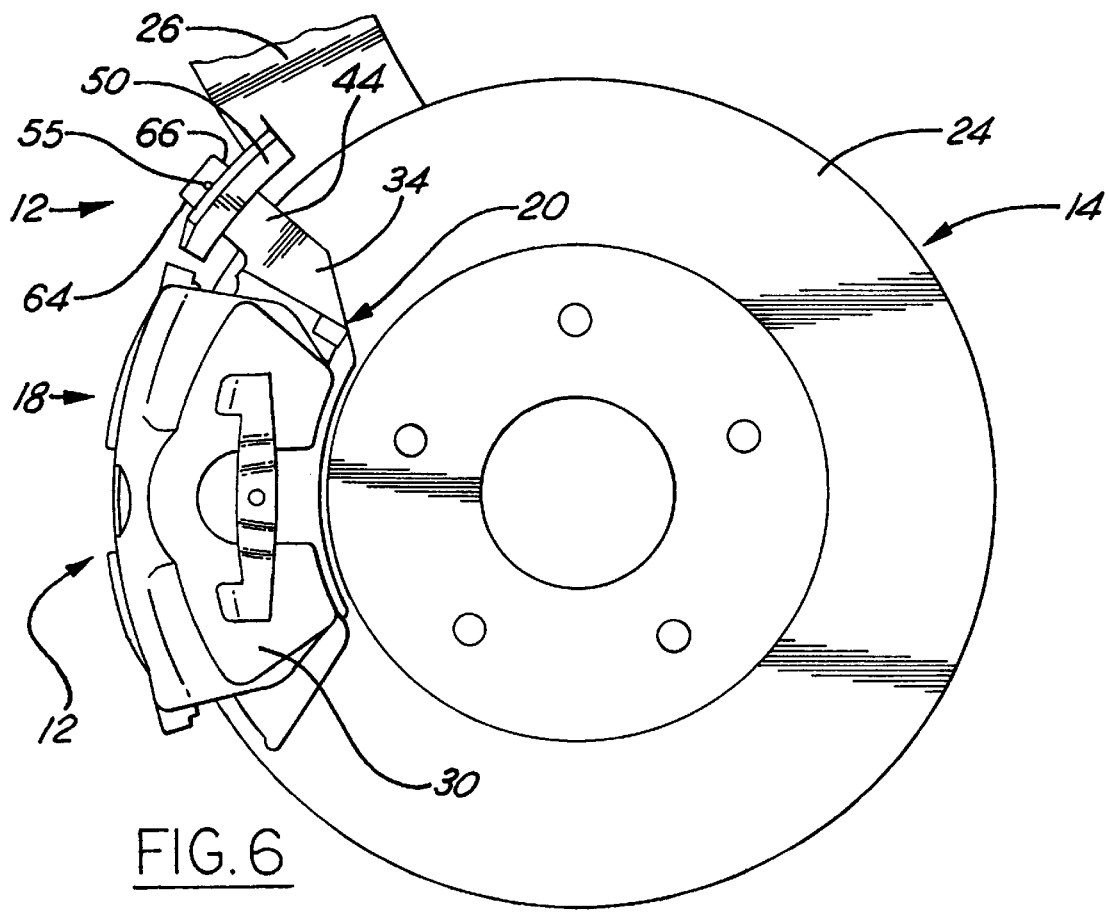
FIG. 6 is a side elevational view of the braking system.

As seen in FIG. 5, a support comprising a rail in the form of a reaction block 50 is rigidly secured as by bolts 51 to the steering knuckle 26. Reaction block 50 has two laterally spaced-apart rectangular slots 52 and 54. The fingers 42 and 44 of the brake pads 20 and 22 extend into the respective slots 52 and 54. Each finger may be pinned in its slot or retained therein by a transverse pin through a hole 55 in the finger bearing on the outer surface of the reaction block 50.

The ends 56 and 58 of each slot are parallel to one another and perpendicular to the plane of the finger therein. The sides 60 and 62 of each slot are parallel to the plane of the finger therein.

The backing plates 34, at the leading end portions 38 of the brake pads, extend circumferentially from the fingers 42 and 44 and generally perpendicularly from the slots into which the fingers extend.

The distance between the ends 56 and 58 of the slots 52 and 54 is slightly greater than the distance between the parallel end edges 64 and 66 of the finger therein. The distance between the sides 60 and 62 of the slots 52 and 54 is greater than the distance between the flat parallel sides 68 and 70 of the finger therein by an amount sufficient to allow the brake pads to be moved laterally inwardly and outwardly into and out of frictional contact with the opposite sides of the outer peripheral portion 24 of the rotor.

The trailing end portions 40 of the brake pads are free floating, that is, they are not connected to a reaction block or to any other abutment, nor do they engage any abutment of any kind which would resist rotation. Thus, other than any clipped connection to the caliper jaws or hydraulic cylinder, the brake pads are cantilevered from their leading end portions 38 via loose connection to the reaction block 50.

The point 74 in FIG. 4 is the approximate midpoint circumferentially and radially of the brake pad 20 and represents the point through which all resolved rotor drag forces act circumferentially. The line 78 is a radius from the center 80 of rotation of the rotor 14 to the midpoint 74. The line 82 drawn through the midpoint 74 perpendicular to radius 78 passes through the slot 52. The same relationships apply to the brake pad 22.

This geometric relationship allows the brake pads to radially self-align on the rotor, thereby reducing radial instability of the pads and thereby reducing brake vibration and noise. Since the point of contact between the fingers 42, 44 and the reaction block 50 is on or near line 82 as is resultant point 74 through which all rotor drag forces may be resolved in a circumferential direction, there is little or no radial force tending to radially push or pull the brake pad. This promotes stability and reduces brake noise.

When, during counterclockwise rotation of the wheel 16 in the forward direction as shown in FIG. 4, the brake is applied by actuation of the cylinder 32 to move the brake pads 20 and 22 laterally inwardly to cause the friction material 36 to make contact with the opposite sides of the peripheral portion 24 of the rotor, there is a reaction "pull" on the reaction block 50 through engagement of the fingers 42 and 44 with the ends 56 of the slots 52 and 54. Since the trailing end portions 40 of the brake pads are free floating, virtually all braking forces are reacted through the leading end fingers such that there is no reaction push on the trailing end portions and virtually no resultant instability and squeal as in prior designs. Although the leading end fingers push against the reaction block during clockwise braking of the wheel, the trailing end portions are still not subjected to reaction forces as substantially all braking forces are reacted through the fingers during both forward and rearward braking of the wheel.

What is claimed is:

1. A disc brake assembly comprising, laterally spaced, first and second brake pads each having a leading end portion and a trailing end portion, an axially rotatable brake rotor disposed between said first and second brake pads, a support for said first and second brake pads, said support comprising a reaction block having a pair of slots, the leading end portion of each of said first and second brake pads having a finger, said fingers extending into and being circumferentially restrained by said respective slots, the trailing end portions of the brake pads being unrestrained such that substantially all braking forces are reacted through said fingers, each of said brake pads having a midpoint circumferentially and radially which represents the point through which all resolved rotor drag forces act circumferentially, and wherein a line drawn through said midpoint of each of said brake pads perpendicular to a radius from the axis of rotation of said rotor through said midpoint passes through the slot in which each such finger of said brake pad is engaged.

2. A disc brake assembly according to claim 1, wherein said reaction block is positioned radially outwardly of said brake pads, and said fingers extend radially outwardly from the leading end portions of said brake pads.

3. A disc brake assembly according to claim 2, wherein said brake pads are carried by a generally U-shaped caliper, and a steering knuckle supporting said caliper.

* * * * *